United States Patent [19]

Tohya et al.

[11] Patent Number: 4,636,703
[45] Date of Patent: Jan. 13, 1987

[54] CHARGING APPARATUS

[75] Inventors: Syoichi Tohya; Minoru Takahashi, both of Hyogo, Japan

[73] Assignee: Sanyo Electric Co., Ltd., Japan

[21] Appl. No.: 771,296

[22] Filed: Aug. 30, 1985

[30] Foreign Application Priority Data

Sep. 3, 1984 [JP] Japan .............................. 59-133713[U]
Jun. 7, 1985 [JP] Japan .............................. 60-86502[U]
Jun. 13, 1985 [JP] Japan .............................. 60-89321[U]

[51] Int. Cl.$^4$ .................. H02J 7/00; H01M 10/46
[52] U.S. Cl. ........................................ 320/2; 320/15; 429/99; 307/150
[58] Field of Search ........................... 320/2–5, 320/6, 15; 429/96–100; 307/149, 150

[56] References Cited

U.S. PATENT DOCUMENTS

| | | | |
|---|---|---|---|
| 2,451,726 | 10/1948 | Fry | 320/4 |
| 3,579,075 | 5/1971 | Floyd | 320/2 |
| 4,009,429 | 2/1977 | Mullersman | 320/2 |
| 4,403,182 | 9/1983 | Yeh | 320/2 |
| 4,527,110 | 7/1985 | McCarty | 320/2 |

*Primary Examiner*—R. J. Hickey
*Attorney, Agent, or Firm*—Darby & Darby

[57] ABSTRACT

A charging apparatus comprises a U-shaped cell-accommodation frame structure and a power supply casing. The cell-accommodation frame structure includes an end plate and a pair of arm plates extending from the both ends respectively of the end plate, and the power supply casing is provided with a power supply plug on one surface and cell-connection contact strips on another surface. Two communicating arcuate slots and an elongate slot are formed at the free end portion of each of the arm plates of the cell-accommodation frame structure, and lugs movably engageable with the former and latter slots respectively are formed on each of the side surfaces of the power supply casing, so that the power supply casing is rotatable and horizontally movable relative to the cell-accommodation frame structure, and cells having different lengths can be accommodated in the cell accommodation space from the both sides of the openings of the space.

13 Claims, 21 Drawing Figures

CHARGING APPARATUS

FIELD OF THE INVENTION

This invention relates to a charging apparatus of plug-in type used for charging rechargeable cells (simply referred to hereinafter as cells).

DESCRIPTION OF THE PRIOR ART

As a prior art example of a charging apparatus of this kind, that disclosed in, for example, Japanese Utility Model Publication No. 59-1340 (1984) is known. In the disclosed charging apparatus, a power supply casing having a power supply plug on one surface and cell-connection contact strips on another surface is rotatably coupled to a free end opening of a U-shaped cell-accommodation frame structure. When the charging apparatus is not in use, the plug protruding from the power supply casing is pushed down toward and into the cell accommodation space to be accommodated together with the power supply casing which is slidable in the cell accommodation space of the cell-accommodation frame structure. Therefore, the prior art charging apparatus having such a construction is very compact in configuration. However, the prior art charging apparatus has been defective in that it cannot accommodate cells having lengths different from a designed one due to the fact that its cell accommodation space has a predetermined length in its cell accommodation mode.

Thus, in the prior art charging apparatus, the number of kinds of cells that can be charged has been limited, and a single charging apparatus could not charge a plurality of kinds of cells. Although charging of a plurality of kinds of cells may be achieved by so constructing the charging apparatus, it has inevitably led to the problem of the bulky overall size of the charging apparatus.

SUMMARY OF THE INVENTION

It is therefore a primary object of the present invention to provide an improved, compact charging apparatus which is singly capable of charging a plurality of kinds of cells.

The improved charging apparatus according to the present invention which attains the above object is featured in that the power supply casing provided with the plug is mounted in the free end opening of the U-shaped cell-accommodation frame structure so as to be rotatable and horizontally movable relative to the frame structure thereby providing a variable cell accommodation space.

By so constructing the charging apparatus, cells having different lengths can be loaded as desired in the cell accommodation space, and, thus, more kinds of cells than hitherto can be charged.

In the charging apparatus of the present invention, cell-holding ribs are preferably formed on the inner side surfaces of arm plates of the cell-accommodation frame structure to partition the cell accommodation space into a large-size cell accommodation space located on one side and a small-size cell accommodation space located on the other side, so that more kinds of cells can be accommodated without appreciably increasing the internal volume of the charging apparatus.

In this case, tongues for separately accommodating individual cells of small size are preferably provided in the small-size cell accommodation space so as to facilitate loading and unloading of such cells into and out of the accommodation space.

Grasping recesses corresponding to the cell-holding ribs formed on the inner side surfaces of the arm plates of the cell-accommodation frame structure are preferably formed at the corresponding positions on the outer side surfaces of the arm plates. The provision of such recesses can prevent cramping deformation tending to occur on the outer side surfaces of the arm plates due to formation of the ribs on the inner side surfaces of the arm plates when the cell-accommodation frame structure is molded from a resin.

Connection terminals for connection with a square cell are preferably additionally provided on the power supply casing so that a square cell can also be charged.

It is also preferable that means are provided in the cell accommodation space so that cells of different kinds cannot be accommodated at the same time. By so arranging, the total capacity of cells that can be charged at a time can be substantially fixed. As a result, the capacity of the power transformer can be reduced, and the compact charging apparatus can efficiently charge various kinds of cells.

In this case, a cell-holding rib having a stepped portion and a contiguous seating portion is preferably provided in the cell accommodation space so that a square cell having a length smaller than that of a cylindrical cell can be loaded in the state in which the power supply casing is moved to increase the volume of the cell accommodation space to permit loading of the cylindrical cell having the length larger than that of the square cell. Thus, the square cell can be stably positioned in the charging position while inhibiting loading of other kind of cell or cells at the same time.

Further, a cell-guiding slope portion contiguous to the stepped portion is preferably formed on the cell-holding rib to further facilitate loading of the square cell.

A supporting lug for supporting the head portion of the square cell is preferably provided directly beneath the square-cell connection terminals provided on the power supply casing so that the square cell can be more stably positioned in the charging position.

In the charging apparatus of the present invention, two lugs are preferably provided on each of the side surfaces of the power supply casing, and two communicating arcuate slots and an elongate slot extending along the longitudinal direction of the arm plates are preferably formed at the free end portion of each of the arm plates of the cell-accommodation frame structure so that the lugs are movably received in the former and latter slots respectively. By the provision of these lugs and slots, the power supply casing is made rotatable and horizontally movable relative to the cell-accommodation frame structure.

In this case, locking means are preferably provided so that the lugs movably received in the communicating arcuate slots can be stably locked in the end of the associated arcuate slots. By the provision of the locking means, the power supply casing is maintained stable in the predetermined angular position or in the horizontally shifted position, thereby further ensuring stable loading and unloading of cells.

The locking means may include a projection formed at the end of each of the arcuate slots, and a recess formed on the associated lug so as to be engageable with any one of the projections.

Alternatively, the locking means may include a semispherical lug formed on each of the side surfaces of the power supply casing and a plurality of recesses or holes formed in the associated portion of each of the arm plates of the cell-accommodation frame structure. In such a case, the power supply casing can be shifted stepwise relative to the cell-accommodation frame structure utilizing the resiliency of the arm plates.

DESCRIPTION OF THE PREFERRED EMBODIMENTS

Figure 1A:
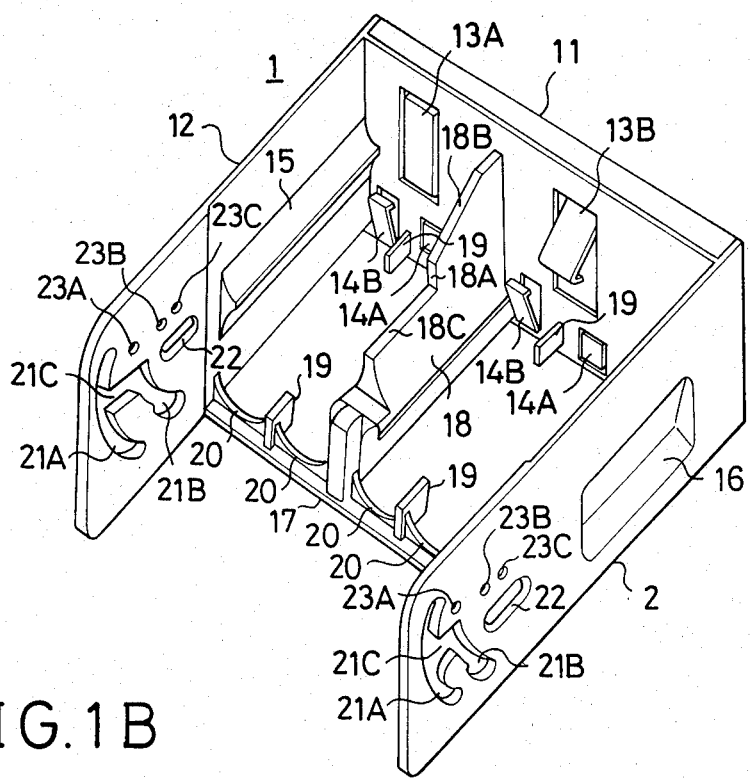
FIG. 1A is a perspective view of a cell-accommodation frame structure employed in a preferred embodiment of the charging apparatus according to the present invention.
Figure 1B:
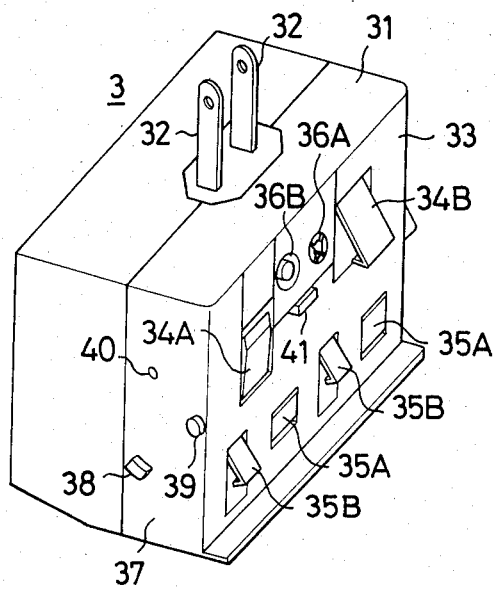
FIG. 1B is a perspective view of a power supply casing employed in the charging apparatus.
Figure 2:
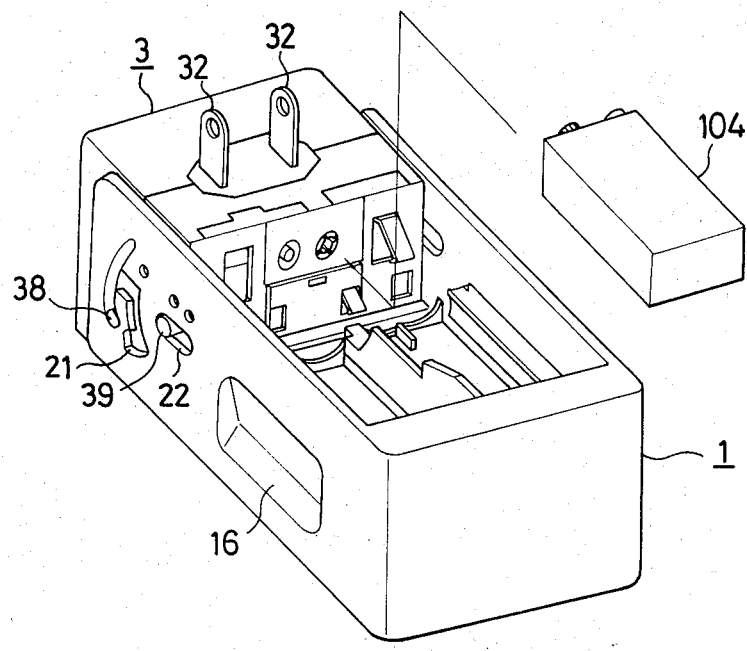
FIG. 2 is a perspective view showing loading of a square cell into the charging apparatus.
Figure 3:
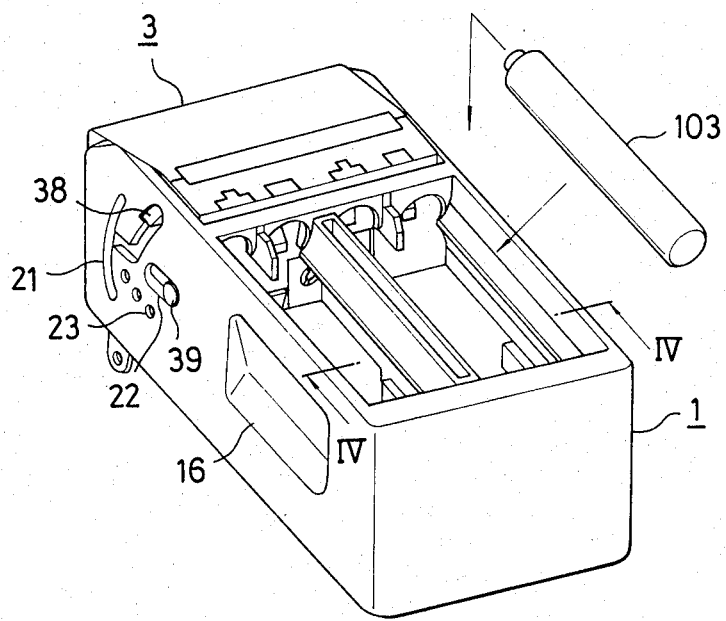
FIG. 3 is a perspective view showing loading of a cylindrical cell of SUM-III type into the charging apparatus.

A preferred embodiment of the charging apparatus according to the present invention comprises an assembly of a cell-accommodation frame structure 1 as shown in FIGS. 1A and 1B and a power supply casing 3 as shown in FIGS. 2 and 3.

The cell-accommodation frame structure 1 is in the form of a generally U-shaped body formed by an end plate 11 and a pair of arm plates 12 extending substantially orthogonally from the both ends respectively of the end plate 11. Contact strips 13A and 13B for connection with the positive and negative electrodes of cylindrical cells of SUM-I or SUM-II type (for example, nickel-cadmium cells) respectively are provided on the inner surface of the end plate 11. These contact strips 13A and 13B are electrically connected with each other in the internal space of the end plate 11. Contact strips 14A and 14B for connection with the positive and negative electrodes of cylindrical cells of SUM-III type respectively are similarly provided beneath each of the contact strips 13A and 13B in FIG. 1A. The arm plates 12 are formed with ribs 15 which serve the dual functions of holding cells in position and partitioning the cell accommodation space into an upper space and a lower space in FIG. 1A. In the case of the illustrated embodiment, the cell-accommodation frame structure 1 is molded from a resin. Therefore, the thickness of the arm plates 12 is not so large, and the formation of the ribs 15 may cause cramping deformation at the corresponding positions on the outer surfaces of the arm plates 12. To prevent such a phenomenon, recesses 16 for grasping purpose are formed at those positions on the outer surfaces of the arm plates 12 corresponding to the ribs 15. A beam 17 extends between the arm plates 12, and, utilizing this beam 17, a rib 18 is provided between the end plate 11 and the beam 17 to serve the dual functions of holding cells and partitioning the cell accommodation space into upper and lower right-hand and left-hand spaces together with the ribs 15 in FIG. 1A. A pair of tongues 19 protrude from the lower part of the end plate 11, and a pair of similar tongues 19 protrude from the beam 17 in aligned relation with the former tongues 19 respectively to serve the dual functions of providing partitions for cylindrical cells of SUM-III type and holding cylindrical cells of SUM-II type in FIG. 1A. Also, holding pieces 20 are formed on the beam 17 for stably holding cells of SUM-III type.

Figure 4:
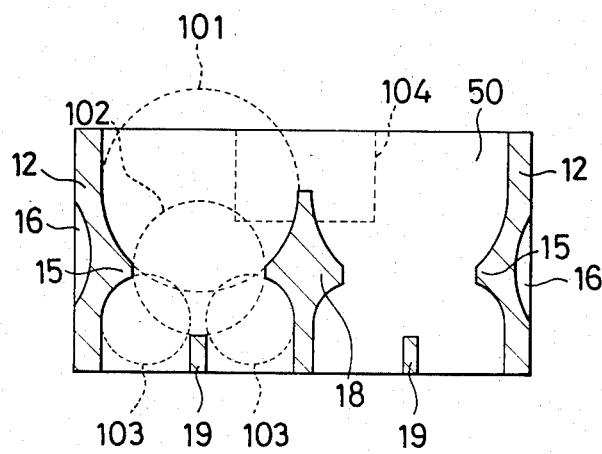
FIG. 4 is a sectional view taken along the line IV—IV in FIG. 3 to illustrate how various cylindrical cells are accomodated in the charging apparatus.

More precisely, as shown in FIG. 4 which is a sectional view taken along the line IV—IV in FIG. 3, the cell accommodation space 50 is partitioned into an upper space and a lower space by the ribs 15 and 18, and a SUM-I type cell 101 and SUM-III type cells 103 are loaded from respectively opposite sides to be held in position by the ribs 15 and 18. In this case, the rib 18 serves also as a left-right partition for the cells 101 and 103. It will also be seen that, when a SUM-II type cell 102 is loaded, it is stably held in position by a three-point support system consisting of the tongues 19 and ribs 15 and 18. The tongues 19 serve also as a left-right partition for the cells 103. The tongues 19 are not in the form of continuous members but are spaced apart from each other in their extending direction, so that the cell 101 or 102 can be pushed out by the finder engaging the cell from behind, thereby facilitating the withdrawal of the cell from within the cell accommodation space 50.

Further, as will be described later, the rib 18 is formed at its upper part with a square-cell seating portion 18C contiguous to a stepped portion 18A, and a guiding slope portion 18B is also formed contiguous to the stepped portion 18A so as to facilitate loading of a square cell into the cell accommodation space.

At each of the free end portions of the arm plates 12 of the cell-accommodation frame structure 1, two arcuate slots 21A and 21B communicating with each other through an interconnecting slot 21C are formed. The arcuate slot 21A has an arcuate length of a ¼-arc, while the arcuate slot 21B has an arcuate length of a ⅛-arc. An elongate or straight slot 22 is formed adjacent to the arcuate slot 21B on a line extending from the interconnecting slot 21C. Further, three spaced holes 23A, 23B and 23C are formed in the vicinity of these slots. Those holes 23A to 23C may merely be recesses.

The power supply casing 3 contains charging circuit parts (not shown) including a step-down transformer and a rectifier. A power supply plug 32 to be inserted into a socket of a power source protrudes from a surface 31 of the power supply casing 3 to supply power to these charging circuit parts. Contact strips 34A and 34B for connection with the positive and negative electrodes of SUM-I type cells or SUM-II type cells respectively are provided on another surface 33 of the casing 3. Further, contact strips 35A and 35B for connection with the positive and negative electrodes of SUM-III type cells respectively are provided on the surface 33 beneath each of the contact strips 34A and 34B in FIG. 1B. Contacts or terminals 36A and 36B for connection with the positive and negative electrodes of a square cell 104 respectively are disposed between the contact strips 34A and 34B on the surface 33. A supporting lug 41 for supporting the back surface of the square cell 104 is provided beneath those terminals 36A and 36B.

A guide lug 38 adapted to be movably received in the arcuate slots 21A to 21C, another pivot lug 39 adapted to be movably received in the elongate slot 22, and a semi-spherical lug 40 engageable with one of the holes 23A to 23C when the guide lug 38 is situated at the end of one of the arcuate slots 21A and 21B are provided on each of the side surfaces 37 of the power supply casing 3.

The charging apparatus is completed when the guide lug 38 and the pivot lug 39 formed on the side surfaces 37 of the power supply casing 3 are fitted in the arcuate slots 21 and elongate slots 22 formed at the free end portions of the arm plates 12 of the cell-accommodation frame structure 1, respectively.

Figure 5:
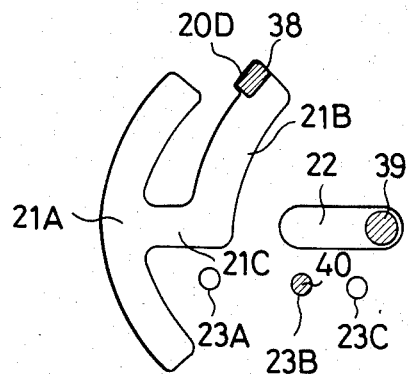
FIG. 5 is a schematic view showing the relation between slots and associated lugs to illustrate movement of the power supply casing relative to the cell-accommodation frame structure in the charging apparatus.
Figure 6:
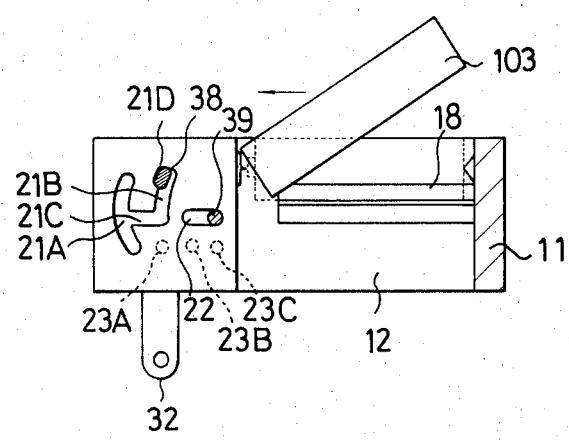
FIGS. 6 and 7 illustrate how a cylindrical cell of SUM-III type is accommodated in the charging apparatus.
Figure 7:
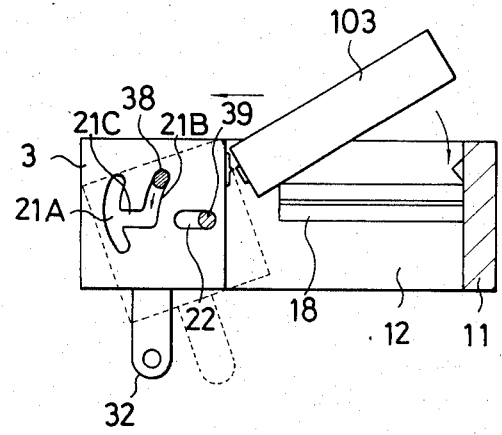

The volume of the cell accommodation space 50 defined between the power supply casing 3 and the cell-accommodation frame structure 1 is smallest when the pivot lug 39 is situated at the right-hand end of the elongate slot 22, and the guide lug 38 is situated at the end of the ⅛-arc arcuate slot 21B as shown in FIG. 5. In such a mode, a SUM-III type cylindrical cell 103 can be loaded from above as shown in FIGS. 3 and 6, and a SUM-II type cylindrical cell 102 can be loaded from beneath. However, the SUM-III type cell 103 and SUM-II type cell 102 cannot be accommodated at the same time since they overlap each other in the cell accommodation space 50 as shown in FIG. 4. In the case of loading of the SUM-II type cell 102, the head of this cell 102 will impart force to the power supply casing 3. However, this force imparts a moment of rotation to the power supply casing 3 in a direction opposite to the direction of rocking movement of the power supply casing 3. Therefore, the power supply casing 3 would not make its rocking movement, and the cell 102 can be loaded without trouble. On the other hand, in the case of loading of the SUM-III type cell 103 from above, the force (shown by the arrow in FIG. 6) imparted to the power supply casing 3 by the head of the cell 103 produces a moment of rotation in the direction of rocking movement of the power supply casing 3 thereby tending to cause rotation of the power supply casing 3 in a direction as shown in FIG. 7. However, since the guide lug 38 is now in engagement with a recess 21D of the ⅛-arc arcuate slot 21B, undesirable rotation of the power supply casing 3 can be prevented. When the guide lug 38 is in engagement with the recess 21D of the ⅛-arc arcuate slot 21B, the semi-spherical lug 40 is in engagement with the step-motion hole 23B. When the guide lug 38 tends to be disengaged from the recess 21D, the semi-spherical lug 40 tends also to be disengaged the hole 23B. However, the arm plates 12 urged slightly away from each other at that time are now restored to their normal position by their resiliency, and the semi-spherical lug 40 is urged toward the hole 23B again by the restoration force of the arm plates 12. As a result, the guide lug 38 is urged always in the direction in which it engages the recess 21D of the slot 21B.

Then, when the semi-spherical lug 40 is disengaged from the hole 23B, and the guide lug 38 and the pivot lug 39 are caused to slide along the arcuate slot 21C and elongate slot 22 respectively until the lug 38 is situated at the upper end of the arcuate slot 21A and the lug 39 is situated at the left-hand end of the elongate slot 22, the volume of the cell accommodation space 50 becomes larger, and a SUM-I type cylindrical cell 101 can now be loaded in the same direction as the direction of loading of the SUM-II type cylindrical cell 102. In this case, the semi-spherical lug 40 is in engagement with the hole 23A.

When the power supply casing 3 is rotated from the above position until the guide lug 38 is situated at the lower end of the arcuate slot 21A and the semi-spherical lug 40 engages the hole 23C, the plug 32 is now accommodated in the cell accommodation space 50.

A square cell has an electromotive force and a current capacity larger than those of SUM-II type and SUM-III type cylindrical cells although its length is the same as that of those cylindrical cells. Therefore, in order that the square cell and another cell, for example, a cylindrical cell 103 can be charged at the same time, the power supply capacity of the power supply casing 3 must be increased, resulting inevitably in an increase in the cost and size of the charging apparatus. For the purpose of reducing the cost of and making compact the structure of the charging apparatus, the embodiment is so constructed as to inhibit the simultaneous charging of the square cell and the cylindrical cell.

Figure 8:
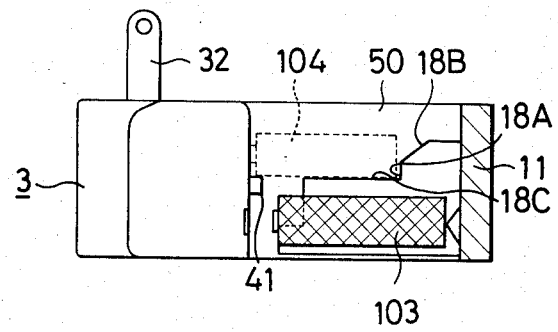
FIGS. 8 and 9 illustrate how a square cell is accommodated in the charging apparatus.
Figure 9:
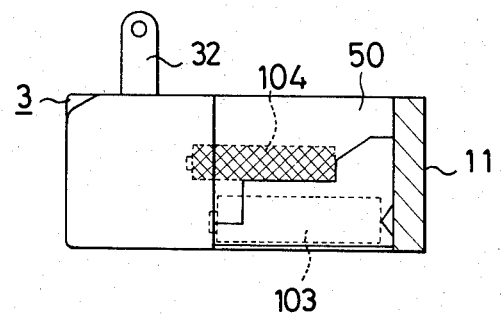
Figure 10:
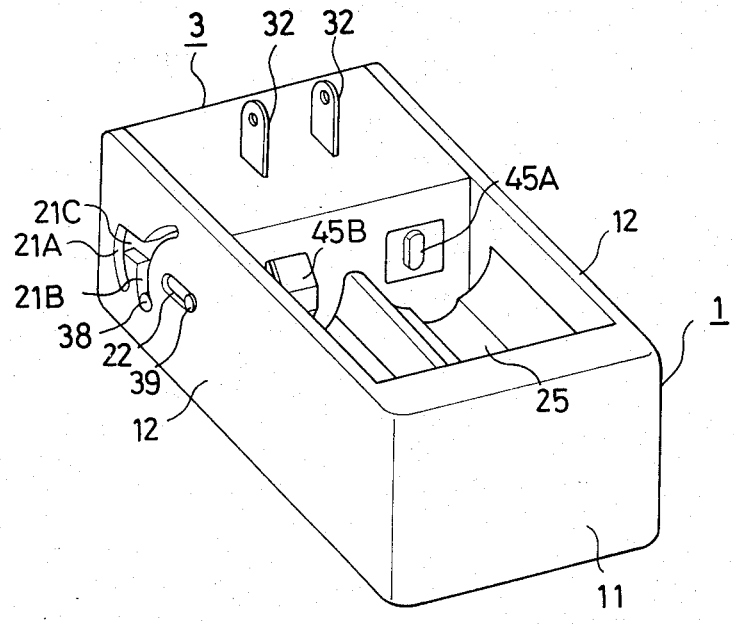
FIG. 10 is a perspective view of another embodiment of the charging apparatus of the present invention when it is in use.
Figure 11:
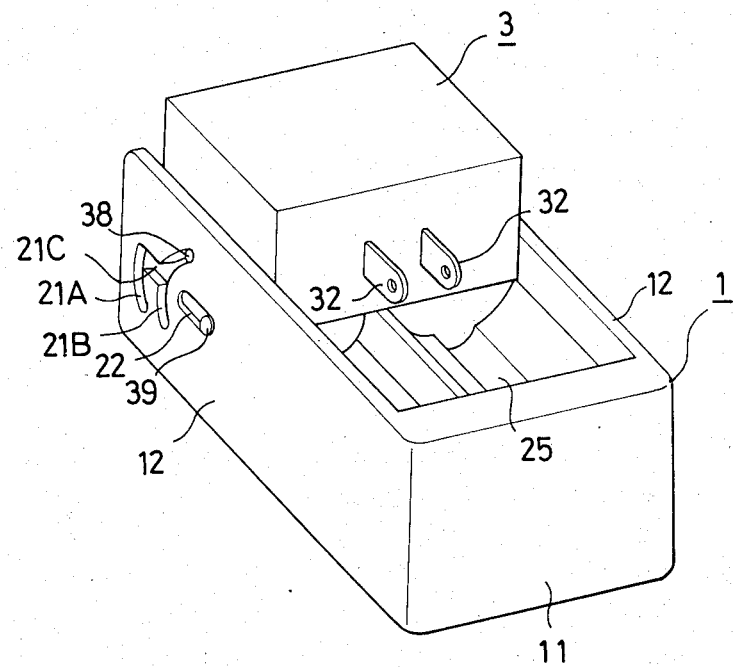
FIG. 11 is a perspective view of the charging apparatus shown in FIG. 10, when it is not in use.

More precisely, as shown in FIG. 8, the square cell 104 is loaded in the same direction as the direction of loading the SUM-I type cylindrical cell 101 in the state in which the volume of the cell accommodation space 50 is increased. Thus, when the square cell 104 to be charged is loaded and accommodated in the position shown in FIG. 8, it is impossible to accommodate any other cell. Further, in the state in which the volume of the cell accommodation space 50 is decreased as shown in FIG. 9, it is impossible to accommodate the square cell 104.

When it is desired to accommodate the square cell 104 to be charged, the square cell 104 is obliquely inserted to straddle the sloped portion 18B and stepped portion 18A of the rib 18, and a downward force is then imparted to the tail of the square cell 104 to cause advancing movement of the head of the square cell 104 until the square cell 104 takes its horizontal position. In such a position, the positive and negative terminals of the squares cell 104 are electrically connected with the respective terminals 36A and 36B provided on the surface 33 of the power supply casing 3, and the square cell 104 is firmly held between the surface 33 of the power supply casing 3 and the stepped portion 18A of the rib 18 without the fear of disengagement or escapement. The square cell 104 is also supported at its head portion by the supporting lug 41. Thus, the square cell 104 is very stably supported in the horizontal position by both the supporting lug 41 and the seating portion 18C of the rib 18.

Figure 12A:
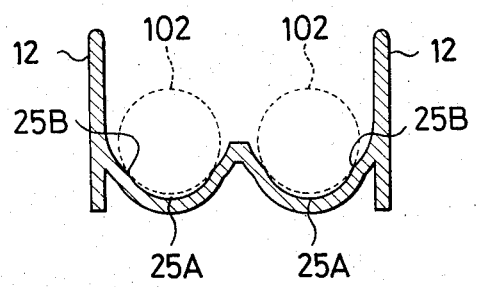
FIGS. 12A, 12B and 12C are sectional views illustrating cylindrical cells of SUM-II type, SUM-I type and SUM-III type accommodated in the charging apparatus respectively.
Figure 12B:
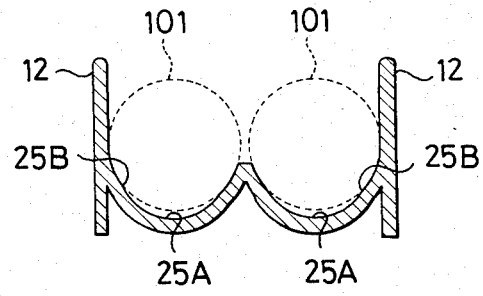
Figure 12C:
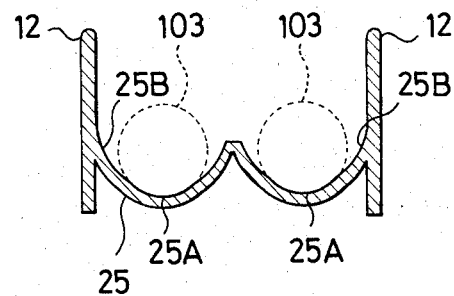
Figure 13A:
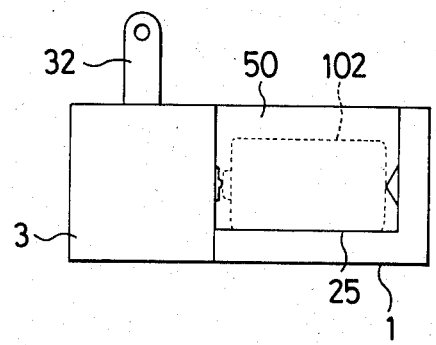
FIGS. 13A and 13B illustrate cylindrical cells of SUM-II type and SUM-I type accommodated in the charging apparatus respectively.
Figure 13B:
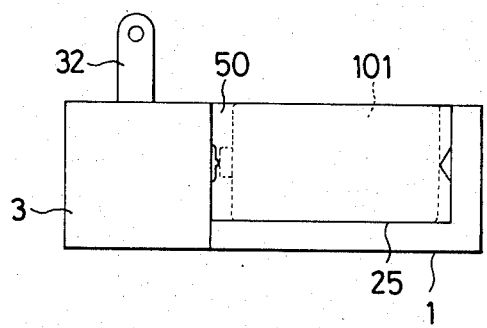
Figure 13C:
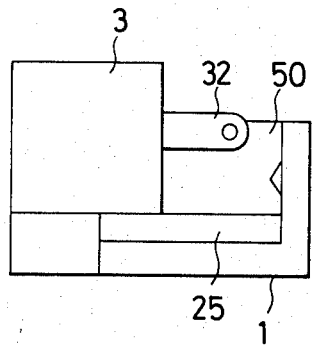
FIG. 13C illustrates the charging apparatus when it is not in use.

The embodiment described above has been constructed to be capable of charging four kinds of cells, that is, cylindrical cells of SUM-I type, SUM-II type and SUM-III type and square cells. However, according to circumstances or requirements, the charging apparatus may be arranged to charge some of those cells only so as to simplify the structure of the charging apparatus. For example, the charging apparatus may be modified as shown in FIGS. 10 to 12C, so that cylindrical cells of SUM-I type, SUM-II type and SUM-III type can only be charged, and one side only of the cell accommodation space can be used for accommodation of such cells. Referring to FIGS. 10 to 12C showing the modification of the charging apparatus, a cell-holding plate 25 formed with narrow channels 25A and wide channels 25B is disposed in the bottom portion of the cell-accommodation frame structure 1, so that SUM-III type cylindrical cells 103 are received in the narrow channels 25A as shown in FIG. 12C, SUM-I type cylindrical cells 101 are received in the wide channels 25B as shown in FIG. 12B, and SUM-II type cylindrical cells 102 are received in a state straddling the channels 25A and 25B as shown in FIG. 12A. On the other hand, positive-electrode contact strips 45A and negative-electrode contact strips 45B common to the SUM-I type, SUM-II type and SUM-III type cylindrical cells 101, 102 and 103 are provided on both the power supply casing 3 and the end plate 11. Further, the arcuate slots 21A and 21B are replaced by a ⅛-arc slot and a ¼-arc slot respectively, so that the overall size of the charging apparatus, when not in use, can be reduced as shown in FIG. 13C.

Figure 14A:
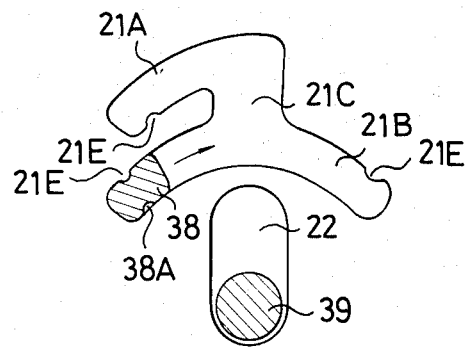
FIGS. 14A to 14C illustrate the function of locking means for stably holding the power supply casing of the charging apparatus in the individual positions respectively.
Figure 14B:
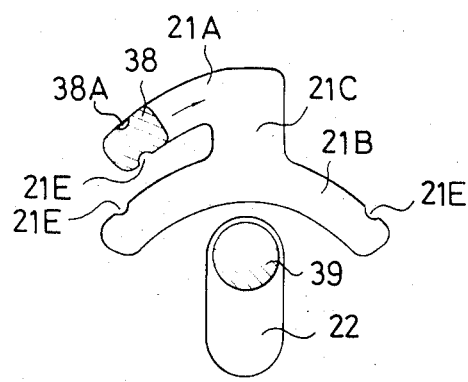
Figure 14C:
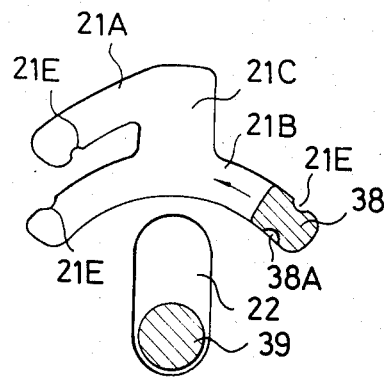

Further, in the aforementioned first embodiment, the engagement of the semi-spherical lugs 40 with the associated holes 23 has been utilized for retaining the lugs 38 at the end of the selected arcuate slots 21A and 21B. However, in lieu of the above arrangement, each of the lugs 38 may be formed with a recess 38A which selectively engages a projection 21E formed at the end of each of the arcuate slots 21A and 21B as shown in FIGS. 14A to 14C. Thus, when the lugs 38 and 39 provided on the power supply casing 3 take the positions shown in FIG. 14A relative to the slots 21B and 22 formed in the arm plates 12, the power supply casing 3 is stably held in a state in which the volume of the cell accommodation space 50 is minimum as shown in FIG. 13A. On the other hand, when the positions of the lugs 38 and 39 relative to the slots 21A and 22 are as shown in FIG. 14B, the power supply casing 3 is stably held in a state in which the volume of the cell accommodation space 50 is maximum as shown in FIG. 13B. Also, when the positions of the lugs 38 and 39 relative to the slots 21B and 22 are as shown in FIG. 14C, the power supply casing 3 is stably held in a state in which the plug 32 is accommodated in the cell accommodation space 50 of minimum volume as shown in FIG. 13C.

We claim:

1. A charging apparatus comprising a generally U-shaped, cell-accommodation frame structure including an end plate having contact strips for connection with cells; a pair of arm plates extending substantially orthogonally from the both ends respectively of said end plate, each arm plate including a free end, the frame structure including a free end opening defined between the free ends of the arm plates; a power supply casing having a power supply plug on one surface and cell-connection contact strips on another surface, said power supply casing being mounted in the free end opening of cell-accommodation frame structure so as to be rotatable and movable relative to said cell-accommodation frame structure along the longitudinal direction of said arm plates so that cells have different lengths can be easily loaded to be charged; and cooperating first and second means for effecting relative rotation and longitudinal movement of the power supply casing and the frame structure, the first means being provided on the arms of the frame structure and the second means being provided on the power supply casing, the frame structure and the power supply casing defining an adjustable cell accommodation space, wherein the cell accommodation space is adjustable to accommodate cells of different sizes by adjusting the relative rotation and longitudinal movement of the power supply casing and the frame structure.

2. A charging apparatus as claimed in claim 1, wherein cell-holding ribs are provided on the inner side surfaces of the arm plates of said cell-accommodation frame structure to form a large-size cell accommodation space and a small-size cell accommodation space in one and the other sides respectively of the cell accommodation space defined between said power supply casing and said cell-accommodation frame structure.

3. A charging apparatus as claimed in claim 2, wherein tongues for separating small-size cells are provided at least in said small-size cell accommodation space.

4. A charging apparatus as claimed in claim 2, wherein recesses for grasping purpose are formed on the outer side surfaces of the arm plates of said cell-accommodation frame structure at positions corresponding to said cell-holding ribs provided on the inner side surfaces of said arm plates.

5. A charging apparatus as claimed in claim 2, wherein connection terminals for cylindrical cells and connection terminals for a square cell are provided on said another surface of said power supply casing.

6. A charging apparatus as claimed in claim 5, wherein means are provided so that different kinds of cells cannot be accommodated simultaneously in said cell accommodation space.

7. A charging apparatus as claimed in claim 6, wherein a stepped portion and a contiguous square-cell seating portion are formed on another cell-holding rib so that a square cell can be loaded in said cell accommodation space when said power supply casing is moved in a direction in which the volume of said cell accommodation space is increased to permit loading of a cell having a large length.

8. A charging apparatus as claimed in claim 7, wherein a guiding slope portion is formed contiguous to said stepped portion to facilitate loading of the square cell.

9. A charging apparatus as claimed in claim 5, wherein a supporting lug supporting the head portion of a square cell is formed beneath said square-cell connection terminals on said power supply casing.

10. A charging apparatus as claimed in claim 1, wherein the second means includes two lugs provided on each of the side surfaces of said power supply casing, and wherein the first means includes two arcuate slots communicating with each other and an elongate slot extending in the longitudinal direction of said arm plates formed at the free end portion of each of said arm plates of said cell-accommodation frame structure, said two lugs being adapted to be movably received in said arcuate slots and said elongate slot respectively formed in each of said arm plates, so that said power supply casing can rotate and move relative to said cell-accommodation frame structure.

11. A charging apparatus as claimed in claim 10, wherein locking means are provided so that said lug movably received in said two communicating arcuate slots formed in each of said arm plates can be stably held at the end of one of said arcuate slots depending on the position of said power supply casing relative to said cell-accommodation frame structure.

12. A charging apparatus as claimed in claim 11, wherein said locking means include a projection formed at the end of each of said arcuate slots and a recess formed on said lug to be engageable with said projections.

13. A charging apparatus as claimed in claim 11, wherein said locking means include a semi-spherical lug provided on each of the side surfaces of said power supply casing and a plurality of recesses formed on each of the arm plates of said cell-accommodation frame structure engaging said side surfaces of said power supply casing, the resiliency of said arm plates being utilized so that said power supply casing can be shifted stepwise relative to said cell-accommodation frame structure.

* * * * *